H. H. DOVELL.
MACHINE GUN.
APPLICATION FILED AUG. 9, 1917.
1,294,636.
Patented Feb. 18, 1919.
7 SHEETS—SHEET 5.
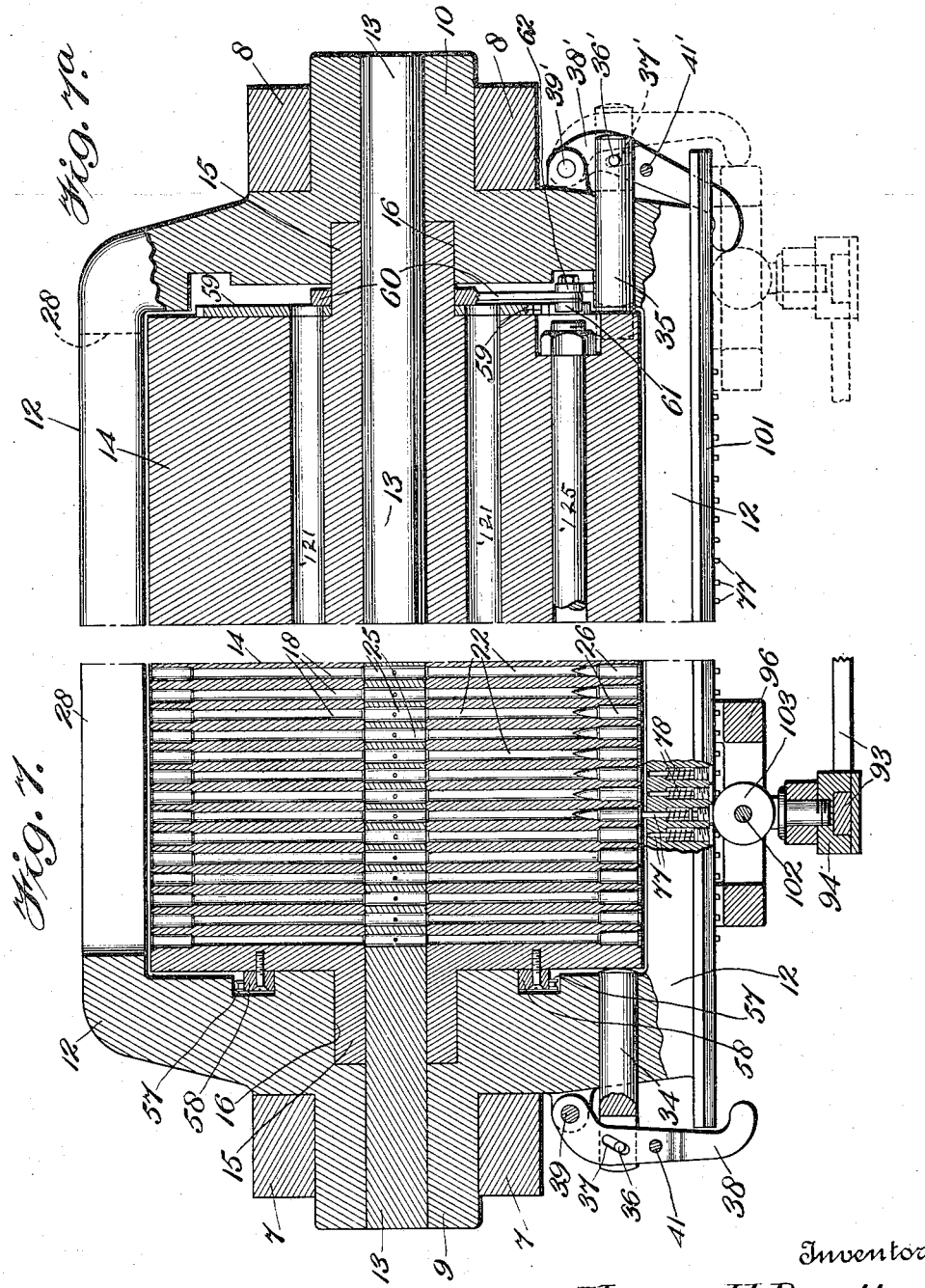
Inventor
Harper H. Dovell, by
F. W. Witherspoon
Attorney

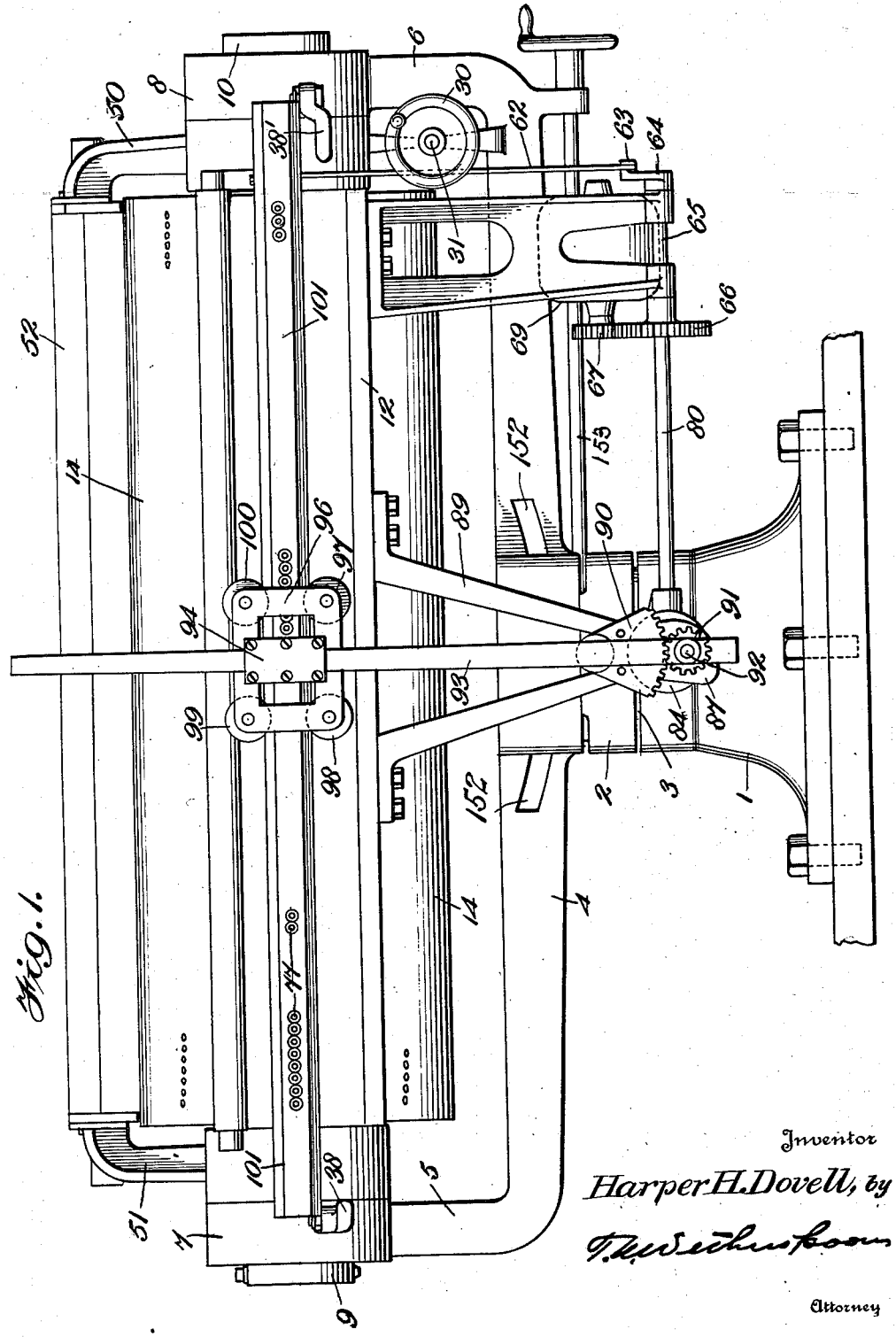

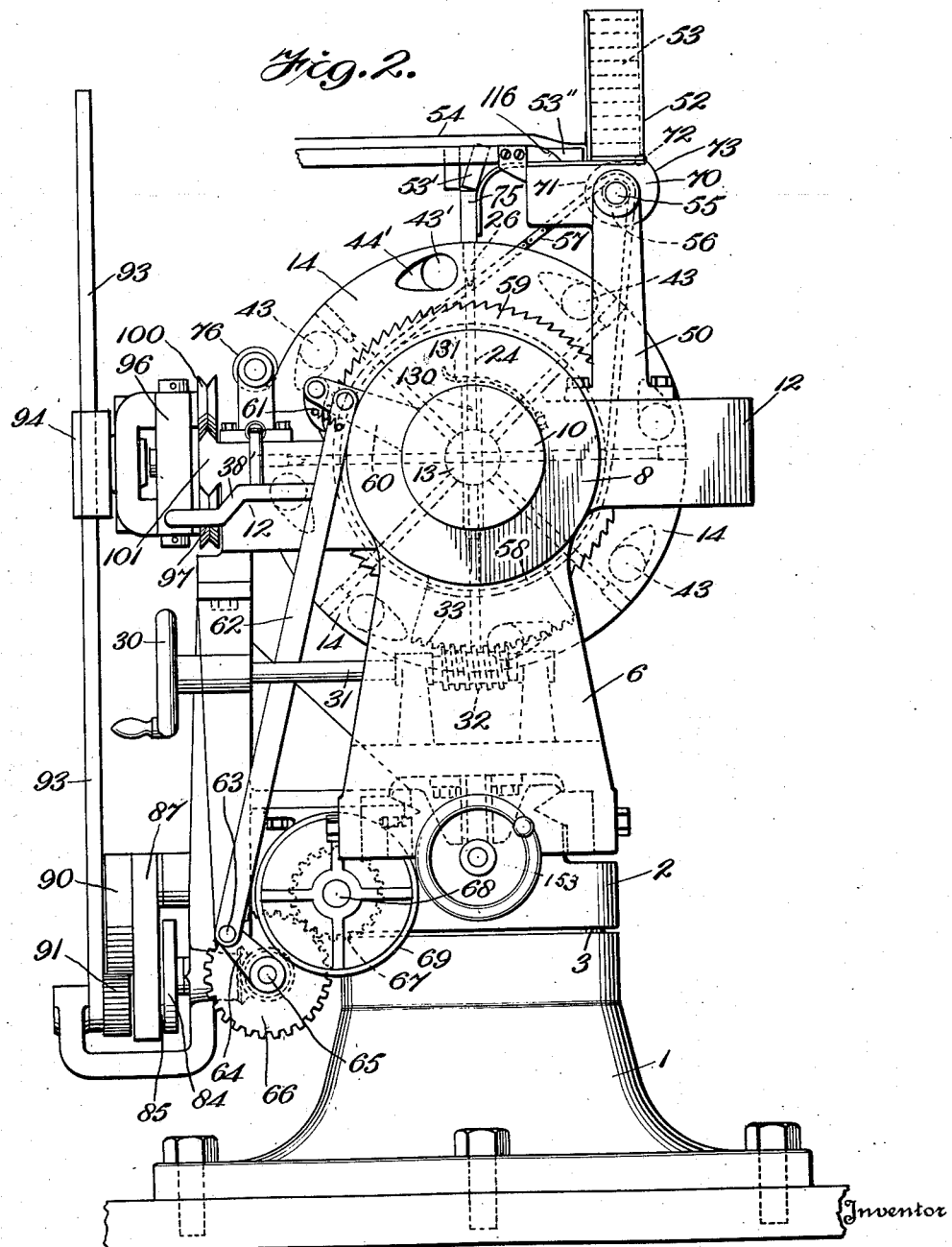

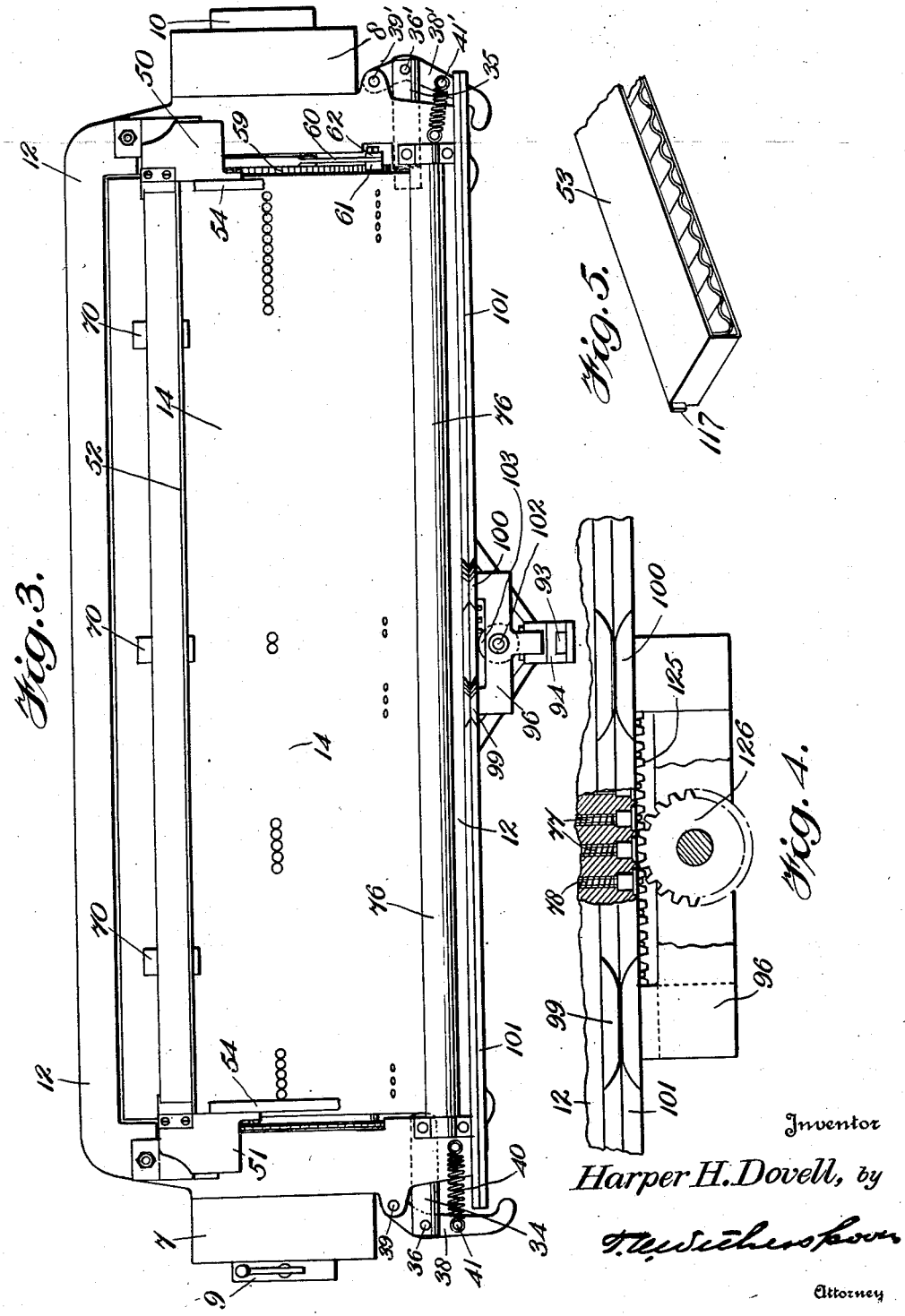

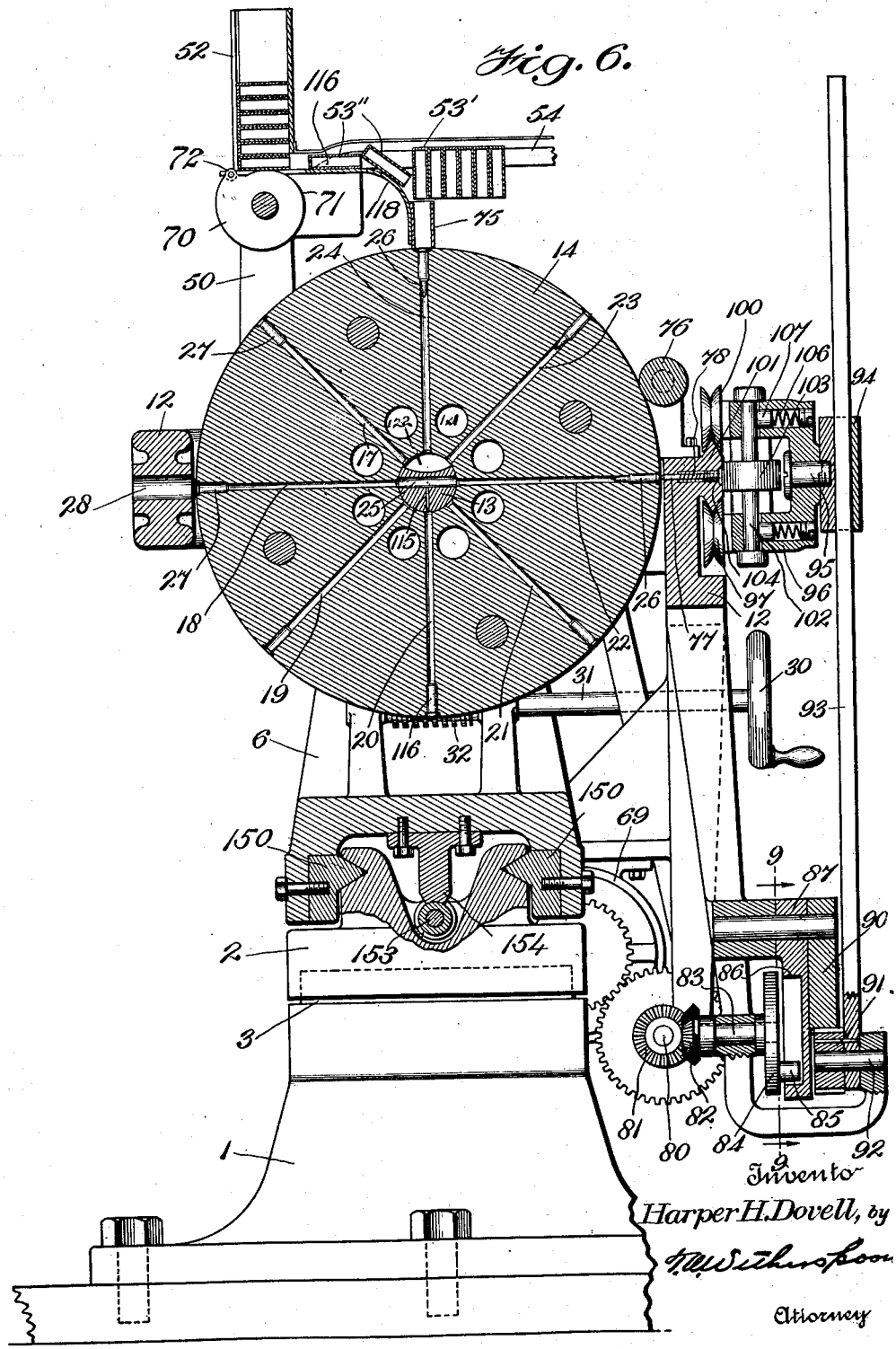

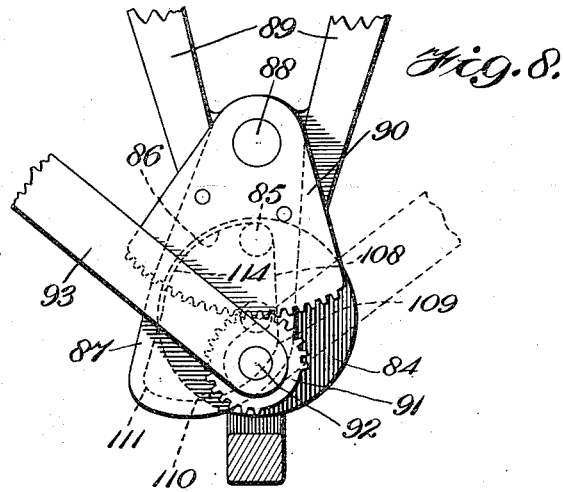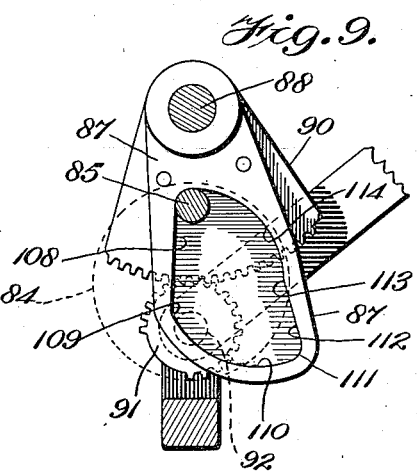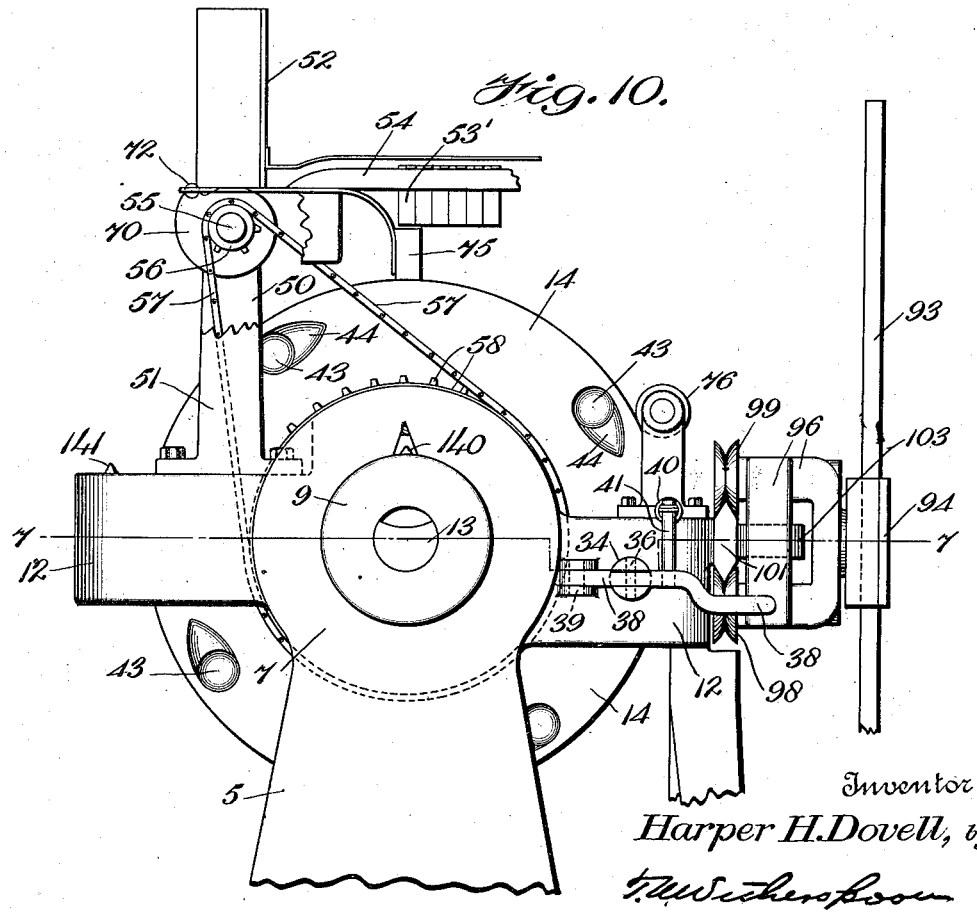

H. H. DOVELL.
MACHINE GUN.
APPLICATION FILED AUG. 9, 1917.

1,294,636.

Patented Feb. 18, 1919.
7 SHEETS—SHEET 7.

Inventor
Harper H. Dovell,
by
T. M. Witherspoon
Attorney

UNITED STATES PATENT OFFICE.

HARPER H. DOVELL, OF BALTIMORE, MARYLAND.

MACHINE-GUN.

1,294,636.    Specification of Letters Patent.    Patented Feb. 18, 1919.

Application filed August 9, 1917. Serial No. 185,287.

*To all whom it may concern:*

Be it known that I, HARPER H. DOVELL, a citizen of the United States, residing at Baltimore, in the State of Maryland, have invented certain new and useful Improvements in Machine-Guns; and I do hereby declare the following to be a full, clear, and exact description of the invention, such as will enable others skilled in the art to which it appertains to make and use the same.

This invention relates to machine guns and has for its object to improve as well as to increase the capacity of weapons of this character which have been heretofore proposed.

With these and other objects in view the invention consists in the novel details of construction and combinations of parts more fully hereinafter disclosed and particularly pointed out in the claims.

Referring to the accompanying drawings forming a part of this specification in which like numerals designate like parts in all the views:—

Figure 1 is a front elevational view of a machine gun made in accordance with this invention;

Fig. 2 is an end elevational view of the parts shown in Fig. 1 as seen from the right of said figure;

Fig. 3 is a plan view of the parts shown in Fig. 1;

Fig. 4 is a detail view of a modified form of firing mechanism;

Fig. 5 is a detail perspective view of a portion of one of the cartridge clips;

Fig. 6 is a transverse sectional view of the parts shown in Fig. 1;

Fig. 7 is a sectional view taken on the line 7—7 of Fig. 10;

Figure 11:
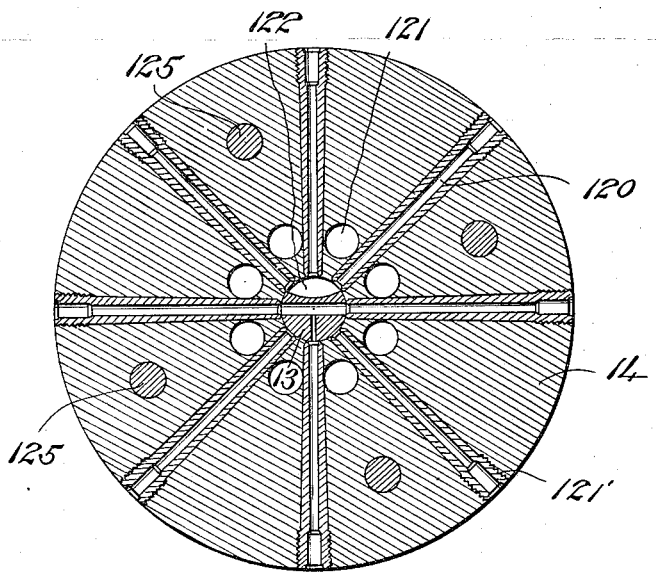
Figure 12:
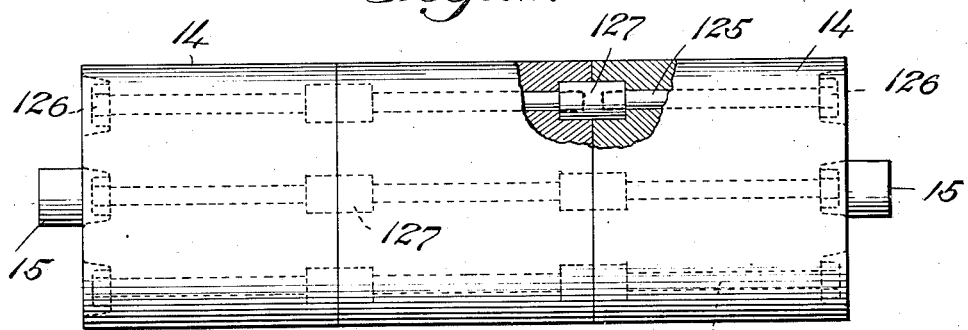

Fig. 7ª is a sectional view similar to Fig. 7 but taken on such lines as to show the ventilating openings of the drum as well as the balls employed in the modified construction of drum shown in Fig. 12;

Fig. 8 is an enlarged detail view showing a portion of the firing mechanism;

Fig. 9 is an enlarged detail sectional view taken on the line 9—9 of Fig. 6;

Fig. 10 is a partial end elevational view of the parts shown in Fig. 1 as seen from the left of said figure;

Fig. 11 is a cross sectional view of a modified form of drum provided with rows of barrels; and Fig. 12 is a plan view, partially in section, illustrating a modified form of drum bolted together in sections.

1 indicates any suitable support on which the mechanism is mounted, 2 the base of the gun proper suitably swiveled as at 3 on the support 1, 4 a framework supporting the parts rigid with the base 2 and provided with the upwardly extending arms 5 and 6. The arm or extension 5 has rigidly joined thereto the bearing 7, and the arm or extension 6 has joined thereto the arm or bearing 8. Journaled in the bearings 7 and 8 are the cylindrical extensions 9 and 10 respectively. Said extensions are rigid with the frame 12 which is adapted to oscillate with the drum 14 and extensions 9 and 10, as will presently appear.

Passing through the axis of the extensions 9 and 10 is the removable cylindrical member 13 on which is revolubly mounted the cartridge carrying drum 14 provided with the cylindrical extensions 15 fitting the recesses 16 with which the frame or loop 12 is provided.

The said drum 14 is provided with a plurality of rows of bores for the cartridges lettered in this instance 17, 18, 19, 20, 21, 22, 23 and 24 as best shown in Fig. 6. Each row of bores is adapted to receive any desired number of cartridges, it being preferred to provide 93 bores in each row and to fit barrels in said rows so that each eight rows here illustrated will contain 744 barrels in all.

The cylindrical member 13 above mentioned does not nomally revolve on its axis but the drum 14 revolves around said cylinder as will further appear below. Said cylinder, however, is provided with the single row of bores 25 and may also have 93 barrels or the same number of barrels as are contained in each of the rows lettered from 17 to 24. Said row of bores 25 passes diametrically through the cylinder 13 and it is adapted to successively register with each of said rows of bores 17 to 25 as will further appear below.

As will likewise appear below, when a row of cartridges such as 26 is fired the individual bullets or projectiles pass down their corresponding bores such as 22, pass through the row of bores 25, through the diametrically opposite row of bores 18, through the row of chambers 27 and out the slot 28 with which the loop frame 12 is provided.

Therefore, the said slot 28 corresponds to the muzzle of the gun. Any given row of bores of the drum 14 may be elevated or depressed along with the frame 12 and muzzle 28 to correspond with varying ranges and the rows of bores in said drum 14 as well as the muzzle 28 may further be turned in azimuth to correspond with the direction of the target by the mechanism now to be disclosed.

To elevate or depress the muzzle 28 the hand wheel 30 is rotated, which rotates the shaft 31 carrying the worm 32 engaging the circular rack 33 rigid with the frame 12 as will be readily understood from Fig. 2 of the drawings.

As the frame 12 is thus moved by means of the rack 33, the drum 14 is rotated on its axis through the connections now to be disclosed. The said loop frame 12 is provided at one end with the sliding locking bolt 34 and at its other end with the sliding locking bolt 35. Said bolt 34 is provided with a pin 36 accommodated by a slot 37 with which the dog 38 is provided. Said dog is pivoted as at 39 to the frame 12 and is controlled by the spring 40 connected with the pin 41 with which said dog 38 is also provided, see Figs. 3 and 10.

The said locking bolt 34 is adapted to move into the locking notches or depressions 43 with which the drum 14 is provided, as said depressions register with said pin during the rotation of the drum and to thus normally hold the drum firmly in its firing position. Each of the depressions 43 is provided with a slightly sloping or beveled depressed portion 44 to permit the locking end of the bolt 34 to gradually reach the locking portion 43 of each depression as will be readily understood from the drawings.

It will therefore be clear that as the frame 12 is elevated or depressed by means of the circular rack 33 the firing drum 14 will likewise move with said frame owing to its being locked to said frame by the bolt 34 or the bolt 35.

The construction of the locking bolt 35 and its associated mechanism is identical with the construction of the locking bolt 34, and its associated mechanism just described, and its parts have been given the same numerals with a prime mark added. That is to say, said associated parts are lettered 36', 37', 38', and 39' respectively. Further, the said locking bolt 35 enters depressions 43' provided with tapered extensions 44' in all respects identical with the depressions 43 above mentioned. Said depressions 43' however, are located on the drum 14 at the end opposite to that carrying the depressions 43, and said depressions 43' are staggered or angularly displaced with relation to the depressions 43 as will be clear from Fig. 2. That is to say, the depressions 43 are located at 90° from each other as illustrated, while the depressions 43' are also located at 90° from each other, but the distance between successive depressions 43 and 43' is only 45°, all as will be clear from the drawings. The purpose of thus locating the depressions 43 and 43' will appear hereinafter.

The muzzle 28 having been elevated or depressed by means of the hand wheel 30 and its associated mechanism the gun and muzzle may then be readily turned in azimuth by merely taking hold of any convenient part such for example as the frame 12, and bodily rotating the same on its vertical pivot 3 until the sights to be disclosed below are brought on the target. After the gun is fired the drum is loaded by a mechanism of the following construction. Rigidly mounted on the frame 12 are the brackets 50 and 51 adapted to support the hopper 52 carrying the cartridge clips 53 each adapted to hold 93 cartridges, and also supported on said brackets 50 and 51 is the guide way 54 for said clips 53. Extending between the brackets 50 and 51 is the shaft 55 provided with the sprocket wheel 56 over which passes the sprocket chain 57 which also passes over the sprocket wheel 58 rigid with the drum 14. The said drum also carries rigidly secured thereto the ratchet wheel 59.

As best shown in Figs. 7 and 7ª, the sprocket 58 and the ratchet wheel 59 are located at opposite ends of the drum 14. Preferably at the same end of the drum as that at which the ratchet 59 is located, I provide the arm 60 loosely mounted on the extension 15 of the drum and provided with the pawl 61 adapted to engage the ratchet 59, see Fig. 2. To said arm 60 is joined the link 62 carried by the pin 63, carried by the crank 64, mounted on the shaft 65, rigid with the gear 66, meshing with the gear 67, mounted on the shaft 68, adapted to be rotated by the motor 69, all as will be clear from Figs. 2, 7 and 7ª.

Going back to the shaft 55 there are mounted thereon preferably three cams 70, see Figs. 2, 3 and 6, on the inactive surfaces 71 of which the said trays or clips 53 are adapted to normally rest. Said cams are provided with the rollers 72 adapted to take against the lower edges of the individual clips 53 and as said cams are turned by the sprocket 57, said rollers 72 force the lowermost clip 53 from beneath the upper clips and into the ways 54. In the meantime, the raised or active surfaces 73 of said cams take under the upper or superposed clips 53 and hold them in position, while the lowermost clip is being fed out from under the column of clips shown in Fig. 2. An individual clip such as 53' having been thus forced by succeeding clips 53'' into the feeding position 1 shown in Fig. 2, the individual cartridges 26 in said clip 53 will follow by gravity into their appropriate barrels or bores belonging to a particular row such as 24 that may at the time be in register with the clip 53'. In order to facilitate the feeding of the cartridges into their appropriate rows of bores there is provided above the drum 14 the stationary guideway 75 as best shown in Fig. 6. The individual or empty clips 53' are successively forced by succeeding empty clips along the guideway 54 and are discharged in any suitable manner.

The turning of a given clip such as 53'' from the position shown in Fig. 2 into the position of the clip 53' shown in said figure is facilitated by means of the curve 116 with which the lug 117, see Fig. 5, carried by each clip takes. Such turning of a clip 53 is further facilitated by the curve 118 as will be clear from Fig. 6 of the drawings.

The cartridges having thus been fed into the successive rows of bores, they eventually pass under the pressure roller 76 just before reaching the firing position and are thus pressed home into their respective chambers 27. As the drum 14 continues to turn under the influence of the motor 69 and the connections above disclosed, the cartridges 26 finally reach the firing position opposite the row of firing pins 77, best illustrated in Fig. 6. Said firing pins are each provided with a spring 78 which normally prevents the firing points from contacting with the cartridges but which permit said points to be readily forced into contact with the primers.

The shaft 65 has an extension 80, see Fig. 1, to which is connected the beveled gear 81 meshing with the bevel 82, rigid with the shaft 83, carrying the disk 84 provided with the pin 85 adapted to operate against the cam surface 86 all as will be clear from Figs. 1, 6, 8 and 9. The cam surface 86 is carried by the cam 87, pivoted as at 88 to the support or bracket 89, rigid with the frame 12. Rigid with the pin or shaft 88 is the circular rack 90 meshing with the gear 91, mounted on the pivot 92 rigid with the firing lever 93. The said firing lever 93 has slidably attached thereto as by the bracket 94 the firing mechanism now to be disclosed.

Referring more particularly to Fig. 6, the slidable bracket 94 has secured thereto as by the pin 95 the rectangular supporting bracket 96 provided with the four guide wheels 97, 98, 99 and 100. Said wheels are provided with the grooves shown and are guided by the bevel guide rail 101 with which the frame 12 is provided. It therefore follows that as the said firing lever 93 is reciprocated backward and forward and to the right and left, as seen in the drawings, the said guide wheels lettered from 97 to 100 will move along the guide rail 101 from one end of the cartridge drum 14 to the other. Also mounted in the frame 96 is the vertical pivot shaft 102 on which is mounted the firing roller 103 adapted to successively contact with the heads 104 of the firing pins 77. Said firing pins extending through the guide rail 101 as illustrated, and there being one firing pin for each cartridge, it is evident that as the firing lever 93 thus moves the firing roller 103, the cartridges in any particular row such as 26 will be successively fired.

The springs 106 carried by the frame 96 serve to cushion the action of the firing roller 103 and they also serve to keep the same well lubricated as by means of the member 107. After a row of cartridges has been fired in the manner above disclosed, it is necessary that the firing lever 93, or that the firing roller 103 shall remain stationary or quiescent for a time sufficient to bring another row of cartridges into the firing position, or sufficient for the drum 14 to be moved through an angle of 45°. This dwell of the firing lever 93 is accomplished by the shape of the surface 86 and the cam 87 as will now be disclosed.

Considering the position of the parts illustrated, see Fig. 8, the actuating pin 85 moving in a clockwise direction, has traversed a dwell portion 114 of the cam and is about to contact with an active portion 108 of said cam surface.

As the pin 85 thus moves along the surface 108 it will quickly move the lever 93 from the full line position shown in Fig. 8 to the dotted line position shown in said figure, in which latter position the lever 93 has traversed the entire row of cartridges, the latter have been fired, and the pin has reached the point 109 of the cam surface or has traversed the entire active portion 108 of said cam surface which controls this particular movement of said lever 93. After the point 109 has been thus reached, the roller 85 will then traverse the portion 110 of said cam surface which constitutes another dwell or which permits the said lever 93 to remain at rest at the other end of the drum 14 and thus afford sufficient time for the drum 14 to be turned through another angle of 45° and to become locked in the proper position for another row of cartridges to be fired.

The said surface 110 terminates at the point 111 and after the roller 85 passes this last mentioned point, it takes against the active surface 112 of the cam which causes said lever 93 to be returned from its dotted line position in Fig. 8 to its full line position, during which motion it fired still another row of cartridges. After traversing the surface 112 of the cam, the roller 85 reaches the point 113 of said cam whereupon it enters into the dwell portion 114 of said cam and thus causes the said lever 93 to again dwell at the end of its stroke to be again moved across a row of cartridges, all as will be clear from Figs. 8 and 9.

As each cartridge is fired the powder gases pass through the bores such as 22, 25, 18, etc., and each bore in the row 25 being perforated at right angles to its length as by the gas vents 115, these said vents will always register with the corresponding bores in a particular row located at right angles to the row being fired, such for example as the row 20, see Fig. 6. The gas escaping from the various vents 115 will force out any cartridge shells 116 that may be found in the bores occupying the position of the row 20. These said cartridge shells are forced vertically downward and of course may be deflected by any suitable means not shown so as to land at any desired point. In other words, the vents 115 constitute a gas ejecting means.

A row of cartridges having been fired in the manner just described the movable member 96 will, at the ends of its stroke, first strike the locking dog 38 to unlock the drum and permit it to be thus moved through an angle of 45° and will next strike the locking dog 38′, and thus unlock the drum to permit the latter to be moved through another angle of 45°. It will now be observed that only one of the dogs 38 or 38′ is in locking position at the same time, and further that when one dog such as 38′ has been released from its locking position, the drum 14 must be turned 45° before the other dog 38 is in its locking position. The parts are so timed that as the lever 93 and movable bracket 96 move toward the right, as seen in Fig. 1, for example, and thus unlock the dog 38′, the pawl 61 will have been moved backward or in a clockwise direction, as seen in Fig. 2, and have taken a new hold on the ratchet 59. It now begins its stroke in a counter clockwise direction and turns the drum 14 through an angle of 45° and thus permits the other locking dog 38 to be brought into its locking position. At this particular period of the cycle the power disk 84, see Figs. 8 and 9, has brought the pin 85 to a dwell portion of the cam 87, so that the continued rotation of the disk and pin will not further actuate the same. The cam 87 not being actuated during this particular period of the cycle, the lever 93 is not actuated, and therefore, the dog 61 has time to again move in a counter clockwise direction, to take a fresh hold, and to again rotate the drum 14 through another 45°. In the meantime a particular row of bores such as 24 will be brought into register with a loaded clip and a row of cartridges such as 26 will be inserted therein to be later passed down under the roller 76 and pressed home. In the somewhat modified form of the invention illustrated in Fig. 11, I have shown a plurality of rows of barrels 120 which are conveniently screwed into the drum 14 as at 121′ and which may be provided with beveled muzzles as shown, in order to secure a tight fit. The drum 14 is preferably provided in all cases with venting openings such as 121 near the center so as to keep this portion of the drum as cool as possible. Further in order to facilitate the cooling of the parts I have cut away the upper portion of the cylinder 13 as indicated at 122. This said cut-away space 122 is conveniently made of such dimensions as to contact with say three rows of bores thus enabling air to get to said member 13 through one row of said bores after the cartridge shells have been extracted therefrom, and also to circulate in at least two rows of bores after they have been reloaded.

In the still further modified form of the invention illustrated in Fig. 12 I preferably make the cartridge carrying drum 14 in as many sections as desired. That is to say, in Fig. 12, I have illustrated three sections which may be conveniently joined together by means of the bolts 125 provided with the nuts 126 and with the key members 127. These said bolts 125 extend through the drum 14 at convenient points as illustrated and firmly hold the parts together. The prime advantage of thus constructing the drum of a plurality of sections resides in the fact that the drum may be made of any capacity desired, and it further can be manufactured or worked on by different workmen at the same time. That is to say, if three sections are employed as shown in Fig. 12, a different set of workmen may be simultaneously working on each of the sections and therefore, the time of finishing a given drum is greatly hastened.

During the firing operation the cylindrical member 13 will heat up but said cylinder is so constructed that it may be readily withdrawn and a new cylinder put in place. In order to hold the said cylinder 13 firmly in position while being used and yet to provide for its ready removal, I may employ any suitable and well known locking mechanism.

In Fig. 2, I have illustrated in dotted lines a pin 130 controlled by a locking spring 131 which serves to detachably hold the cylinder 13 in place and to permit its ready removal when desired. The gun is readily sighted by any convenient telescopic or other sights, and I have conventionally shown the sights 140 and 141 in Fig. 10.

The operation of this invention will be clear from the foregoing but may be briefly summarized as follows:—

The muzzle 28 and any row of bores such as 18 that registers therewith is raised or lowered by turning the hand wheel 30. The said muzzle and bores are further turned in azimuth by catching hold of the framework such as 12 or other convenient parts of the gun and turning the same on the vertical pivot 3, or for finer adjustments in azimuth, the entire mechanism may be turned on the guides 150 and its associated mechanism, see Fig. 6. The slots 152, see Fig. 1, and mechanism 153, 154, see Fig. 6, serve to level the gun when it is desired to do so.

The gun being laid in the desired position, the firing lever 93 may be moved by hand or it may be moved by the motor 69 from one end of the firing drum 14 to the other, thus causing the firing wheel 103 or the modified firing wheel 126 (see Fig. 4) to traverse the entire row of firing pins 77 and cause them to explode the cartridges 26 in a row such as 22 whereupon the bullets of said cartridges will pass down the bore 22 through the row of bores 25, through the opposite row of bores 18, out the row of chambers 27 and through the slot or muzzle 28 to the target aimed at. The said movable member 96 is caused by the mechanism shown in Figs. 8 and 9 to dwell after each stroke and to strike the locking levers 38 and 38', see Fig. 3, and thus unlock the drum after each stroke and permit it to be turned 45° whereupon it is automatically locked again in position, by a locking bolt such as 35 or 34. In the meantime, the cams such as 70 are turned through the sprocket wheel 56, sprocket chain 57, and connections from the motor 69, and said cams force clips 53 of the cartridges from the hopper 52 into the portions shown in Fig. 6, whereupon said cartridges are fed in the appropriate row of bores. As each row of bores such as 24 for example is thus filled with cartridges said cartridges are brought under the presser roller 76 and pressed home whereupon they are then brought into the firing position shown. The vent openings 121 and 122 serve to cool the drum 14 and when the cylindrical member 13 becomes too hot it is readily detached from the gun and a new one put in place. This gun may be employed with or without barrels but it is preferred to employ barrels such as 120, illustrated in Fig. 11, and it is further preferred to make the firing drum 14 in a plurality of sections as illustrated in Fig. 12. These said sections are brought together as by the means 125 and thus permit the gun to be made of any desired capacity while at the same time permitting a plurality of workmen to simultaneously finish individual sections and thus hasten completion.

It is obvious that those skilled in the art may vary the details of the construction as well as the arrangement of parts without departing from the spirit of the invention and therefore I do not wish to be limited to the above disclosure except as may be required by the claims.

What I claim is:—

1. In a machine gun the combination of a rotating cartridge carrying drum provided with a plurality of radially disposed rows of bores adapted to receive cartridges; a central supporting member on which said drum rotates provided with a single row of bores with each of which a pair of said first named bores is adapted to simultaneously register; and means for firing the cartridges in each of said first named rows as it registers with said last named row, substantially as described.

2. In a machine gun the combination of a rotating cartridge carrying drum provided with a plurality of radially disposed rows of bores adapted to receive cartridges; a central supporting member on which said drum rotates provided with a single row of bores with each of which a pair of said first named bores is adapted to simultaneously register; means for rotating said drum predetermined distances to cause said first named rows to successively register with said last named rows; and means for firing the cartridges in each of said first named rows as it registers with said last named row, substantially as described.

3. In a machine gun the combination of a rotating cartridge carrying drum provided with a plurality of radially disposed rows of bores adapted to receive cartridges; a central supporting member on which said drum rotates provided with a single row of bores with each of which a pair of said first named bores is adapted to simultaneously register; means for rotating said drum predetermined distances to cause said first named rows to successively register with said last named row; means to lock said drum in its firing position as said rows are brought into position; and means for firing the cartridges in each of said first named rows as it registers with said last named row, substantially as described.

4. In a machine gun the combination of a rotating cartridge carrying drum provided with a plurality of radially disposed rows of bores adapted to receive cartridges; a cental supporting member on which said drum rotates provided with a single row of bores extending diametrically therethrough and with which said first named rows are adapted to successively register; means for rotating said drum predetermined distances to cause said first named rows to successively register with said last named row; means to lock said drum in its firing position as said rows are brought into position; and means for firing the cartridges in each of said first named rows as it registers with said last named row, substantially as described.

5. In a machine gun the combination of a rotating cartridge carrying drum provided with radially disposed rows of bores each bore adapted to receive a cartridge; and a non-rotatable readily removable centrally disposed member around which said drum rotates provided with a single diametrically disposed row of bores extending diametrically therethrough and each of which is adapted to register at different times with a pair of diametrically disposed bores in said first mentioned rows, substantially as described.

6. In a machine gun the combination of a rotating cartridge carrying drum provided with radially disposed rows of bores each bore adapted to receive a cartridge; and a non-rotatable readily removable, centrally disposed member around which said drum rotates provided with a single diametrically disposed row of bores each of which is adapted at one of its ends to register at different times with a corresponding bore in one of said first mentioned rows, and at its other end to simultaneously register with another corresponding bore belonging to another of said first named rows, substantially as described.

7. In a machine gun the combination of a drum provided with a plurality of radially disposed rows of bores each adapted to receive a cartridge; a firing means adapted to move from one end of each row to the other and fire the cartridges therein successively; and means to bring each row one after the other into its firing position, substantially as described.

8. In a machine gun the combination of a drum provided with a plurality of radially disposed rows of bores each adapted to receive a cartridge; a firing means adapted to move from one end of each row to the other and fire the cartridges therein successively; means for causing said firing means to dwell for a predetermined interval after reaching the end of a row; and means to bring each row one after the other into its firing position during one of said intervals, substantially as described.

9. In a machine gun the combination of a drum provided with a plurality of radially disposed rows of bores each adapted to receive a cartridge; a firing means comprising an oscillating lever and a firing pin actuating device adapted to move from one end of each row to the other and fire the cartridges therein successively; means to bring each row one after the other into its firing position; and means to automatically lock each row in said firing position, substantially as described.

10. In a machine gun the combination of a drum provided with a plurality of radially disposed bores adapted to receive cartridges; a centrally located member provided with a single bore extending diametrically therethrough; means to bring said first named bores successively into register with said second named bore; means associated with said second named bore for extracting the empty shells; and means for firing said cartridges when their corresponding bores register with said second named bore, substantially as described.

11. In a machine gun the combination of a drum provided with a plurality of radially disposed bores adapted to receive cartridges; a centrally located member provided with a single bore extending diametrically therethrough; means to bring said first named bores successively into register with each end of said second named bore; means comprising a gas vent associated with said second named bore for extracting the empty shells; and means for firing said cartridges when their corresponding bores register with said second named bore, substantially as described.

12. In a machine gun the combination of a centrally disposed member provided with a diametrically disposed bore and having a gas vent located at an angle to said bore; a rotating cartridge carrying drum having a plurality of radially disposed cartridge receiving bores, two of which are adapted to simultaneously register with said first named bore while another registers with said vent; and means for firing a cartridge in one of said bores while in its registering position, substantially as described.

13. In a machine gun the combination of a rotating cartridge carrying drum provided with a plurality of radially disposed rows of bores adapted to receive cartridges; a central supporting member on which said drum rotates provided with a single row of bores extending therethrough with which said first named rows are adapted to successively register at opposite ends thereof; means to automatically feed cartridges into each of said bores; means to automatically press home the fed cartridges; and means for firing the cartridges in each of said first named rows as it registers with said last named row, substantially as described.

14. In a machine gun the combination of a rotating cartridge carrying drum provided with a plurality of radially disposed rows of bores adapted to receive cartridges; a central supporting member on which said drum rotates provided with a single row of open ended bores with which said first named rows are adapted to successively register; means for rotating said drum predetermined distances to cause said first named rows to successively register with said last named row; means to automatically feed cartridges into each of said bores; means to automatically press home the fed cartridges; and means for firing the cartridges in each of said first named rows as it registers with said last named row, substantially as described.

15. In a machine gun the combination of a rotating cartridge carrying drum provided with a plurality of radially disposed rows of bores adapted to receive cartridges; a central supporting member on which said drum rotates provided with a single row of open ended bores with which said first named rows are adapted to successively register; means for rotating said drum predetermined distances to cause said first named rows to successively register with said last named row; means to lock said drum in its firing position as said rows are brought into position; means to automatically feed cartridges into each of said bores; means to automatically press home the fed cartridges; and means for firing the cartridges in each of said first named rows as it registers with said last named row, substantially as described.

16. In a machine gun the combination of a centrally disposed member provided with a diametrically disposed bore and having a gas vent located at an angle to said bore; a rotating cartridge carrying drum having a plurality of radially disposed, cartridge receiving bores, two of which are adapted to simultaneously register with said first named bore while another registers with said vent; means for firing a cartridge in one of said bores while in its registered position; means to automatically feed cartridges into each of said bores; and means to automatically press home the fed cartridges, substantially as described.

17. In a machine gun the combination of a rotating drum provided with rows of radially disposed bores; means to normally hold clips of cartridges above said drum with the bullet ends of the cartridges pointing in a horizontal direction; and means to feed said clips and cartridges into such positions that the bullet ends of said cartridges will leave said clips and enter said bores under the influence of gravity, substantially as described.

18. In a machine gun the combination of a rotating drum provided with rows of radially disposed bores; means to normally hold clips of cartridges above said drum; and means comprising a guideway and a curved surface associated with said guideway to feed said clips and cartridges into such positions that the bullet ends of said cartridges will leave said clips and enter said bores under the influence of gravity, substantially as described.

19. In a machine gun the combination of a rotating drum provided with rows of radially disposed bores; power means for rotating said drum; means to normally hold clips of cartridges above said drum; and means comprising a cam operated by said power means and a guideway to feed said clips and cartridges into such positions that said cartridges will leave said clips and enter said bores under the influence of gravity, substantially as described.

20. In a machine gun the combination of a rotating drum provided with a plurality of radially disposed bores adapted to receive cartridges; a single row of firing pins with which said bores are adapted to register one at a time; and an oscillating lever provided with a firing means adapted to traverse said row of firing pins in opposite directions, substantially as described.

21. In a machine gun the combination of a rotating drum provided with a plurality of radially disposed bores adapted to receive cartridges; means for inserting cartridges in said bores; a single row of firing pins with which said bores are adapted to register one at a time; an oscillating lever provided with a firing means adapted to traverse said row of firing pins in opposite directions; and power means for rotating said drum and actuating said lever, substantially as described.

22. In a machine gun the combination of a rotating cartridge carrying cylinder provided with radially disposed bores; and a readily removable central cylinder provided with centrally disposed bores adapted to register with said first mentioned bores around which said drum revolves, substantially as described.

23. In a machine gun the combination of a rotating cartridge carrying drum composed of cylindrical sections secured together and provided with a plurality of rows of radially disposed bores; and a central readily attachable cylinder having a diametrically disposed row of bores adapted to register with said first mentioned rows of bores one at a time, and each of said diametrically disposed bores having a cartridge case ejecting vent communicating therewith, substantially as described.

In testimony whereof I affix my signature.

HARPER H. DOVELL.